(12) United States Patent
Whoriskey et al.

(10) Patent No.: US 12,163,659 B2
(45) Date of Patent: Dec. 10, 2024

(54) SPECTRAL OUTPUT HOMOGENISING APPARATUS

(71) Applicant: COOLLED LIMITED, Andover (GB)

(72) Inventors: Gerard Whoriskey, Andover (GB); Alex Gramann, Andover (GB); Luther Hindley, Andover (GB)

(73) Assignee: COOLLED LIMITED, Andover (GB)

( * ) Notice: Subject to any disclaimer, the term of this patent is extended or adjusted under 35 U.S.C. 154(b) by 0 days.

(21) Appl. No.: 18/027,579

(22) PCT Filed: Aug. 18, 2021

(86) PCT No.: PCT/GB2021/052138
§ 371 (c)(1),
(2) Date: Mar. 21, 2023

(87) PCT Pub. No.: WO2022/064168
PCT Pub. Date: Mar. 31, 2022

(65) Prior Publication Data
US 2023/0375158 A1    Nov. 23, 2023

(30) Foreign Application Priority Data
Sep. 25, 2020   (GB) ..................... 2015230

(51) Int. Cl.
*F21V 9/40*       (2018.01)
*F21V 9/30*       (2018.01)
*F21Y 113/10*    (2016.01)
(52) U.S. Cl.
CPC ............. *F21V 9/40* (2018.02); *F21V 9/30* (2018.02); *F21Y 2113/10* (2016.08)

(58) Field of Classification Search
CPC .......... F21V 9/30; F21V 9/40; F21Y 2113/10; F21Y 2115/10; F21Y 2115/30;
(Continued)

(56) References Cited

U.S. PATENT DOCUMENTS

| 6,796,697 B1 | 9/2004 | Bragg et al. |
| 11,022,869 B2 * | 6/2021 | Sakata ............... G03B 21/2013 |

(Continued)

FOREIGN PATENT DOCUMENTS

| EP | 2 708 808 A1 | 3/2014 |
| EP | 3 091 388 A1 | 11/2016 |

OTHER PUBLICATIONS

International Search Report and Written Opinion on PCT App. PCT/GB2021/052138 dated Nov. 22, 2021 (16 pages).
(Continued)

*Primary Examiner* — Zheng Song
(74) *Attorney, Agent, or Firm* — Foley & Lardner LLP

(57) ABSTRACT

There is described a spectral output homogenising apparatus, the apparatus comprising; a plurality of light sources, wherein the plurality of light sources emits a spectral output; a first medium proximate the plurality of light sources, wherein the first medium is arranged to spatially homogenise the spectral output of the plurality of light sources; a second medium adjacent the first medium, wherein the second medium is arranged to angularly homogenise the spectral output of the plurality of light sources; wherein the spectral output of the plurality of light sources traverses the first medium before traversing the second medium. There is further provided use of an apparatus to homogenise the spectral output of a plurality of light sources and a method of homogenising light from a plurality of sources.

18 Claims, 7 Drawing Sheets

(58) Field of Classification Search
CPC ......... F21K 9/00; G02B 6/005; G02B 6/0068;
G02B 6/0053; G02B 19/0066; G02B
19/0057; G02B 27/0905; G02B 27/0994;
G02B 5/0278; G02B 5/02
See application file for complete search history.

(56) References Cited

U.S. PATENT DOCUMENTS

| | | | | |
|---|---|---|---|---|
| 11,604,321 | B2* | 3/2023 | Kadijk | G02B 6/0008 |
| 11,762,141 | B2* | 9/2023 | Hoelen | G02B 19/0066 |
| | | | | 362/551 |
| 2008/0285310 | A1* | 11/2008 | Aylward | G02B 6/0038 |
| | | | | 362/625 |
| 2011/0001431 | A1* | 1/2011 | Brukilacchio | G02B 6/4206 |
| | | | | 315/294 |
| 2016/0377785 | A1* | 12/2016 | Chestakov | F21S 43/239 |
| | | | | 362/606 |
| 2017/0139113 | A1* | 5/2017 | Peeters | G02B 6/0085 |

OTHER PUBLICATIONS

International Preliminary Report on Patentability for PCT App. PCT/GB2023/052138 dated Mar. 28, 2023 (9 pages).
Examination Report for UK Appl. GB2105230.2 dated Jan. 23, 2024 (5 pages).

* cited by examiner

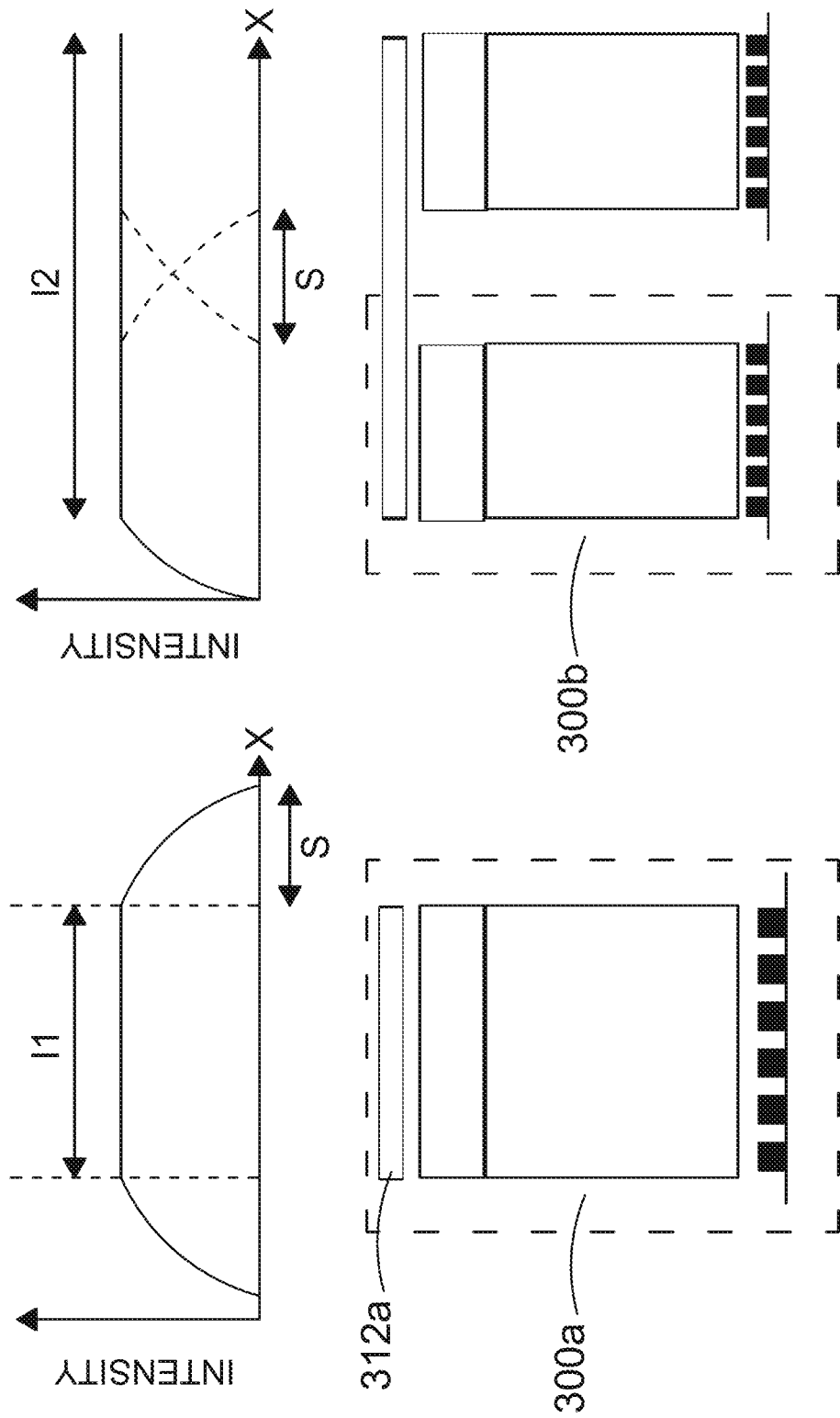

SPECTRAL OUTPUT HOMOGENISING APPARATUS

CROSS-REFERENCE TO RELATED APPLICATIONS

This application claims the benefit of priority to International Application No. PCT/GB2021/052138, filed on Aug. 18, 2021, which claims the benefit of United Kingdom Application No. 2015230.2, filed Sep. 25, 2020, all of which are hereby incorporated by reference in their entirety.

FIELD OF THE INVENTION

The present invention relates to a spectral output homogenising apparatus. The invention also relates to use of a spectral output homogenising apparatus. The invention further relates to a method of homogenising light from a plurality of sources.

BACKGROUND TO THE INVENTION

Many light sources, such as Light Emitting Diodes (LEDs) and lasers, are discrete narrowband or single wavelength sources, and so their spectral output must be mixed to deliver a homogenous broad-spectrum solution, creating an obstacle when multiple light sources are used in combination. Additionally, homogenising discrete or single wavelength light source output is complex in comparison to many standard light sources, such as bulbs, which already emit light across a broad region of the spectrum, often from a single point. Further barriers to overcome include poor intensity of the spectral output of the plurality of light sources, thermal management, electronic control, spectral coverage as well as means of combining different wavelength light sources into a single homogeneous output. As such, in applications wherein standard light sources, such as incandescent bulbs, provide a sub-optimal solution, the move to discrete wavelength sources may not yet be effective, feasible or economic.

However, when such obstacles are overcome, the spectrum of discrete wavelength sources can be adjusted with great efficiency, by varying the number of light sources and the current through them, allowing the spectrum to be tailored in its spectral shape, within a given bandwidth, to an application for greatest impact and efficiency. In contrary, the spectrum of bulbs, such as tungsten-halogen bulbs, is fixed and drops dramatically in output power in the blue and ultraviolet (UV) region, with most energy emitted in infrared (IR) region often causing unwanted heating of the object under illumination.

In spectral imaging applications, numerous obstacles exist surrounding the use of incandescent bulbs and arc lamps. For example, mercury, metal halide, deuterium and xenon bulbs additionally suffer from significant peaks and troughs across their spectrum. Altering of the exposure time of a camera imaging the reflectance of such a source from a sample is required to avoid saturation at the spectral peaks and underexposure in the trough regions. Further, the fixed spectral output from bulb sources can be problematic due to their wider than needed spectral profile and power variation across the spectrum. A camera or detector may struggle to gain sufficient power in certain regions resulting in poor signal-to-noise of the image.

In this way, there is a need for a means to successfully homogenise the spectral output of discrete wavelength light sources, in particular to homogenise the output of a plurality of these discrete wavelength light sources such that they can be successfully employed in a greater range of applications.

Objects and aspects of the present claimed invention seek to alleviate at least these problems with the prior art.

SUMMARY OF THE INVENTION

According to a first aspect of the invention, there is provided a spectral output homogenising apparatus, the apparatus comprising; a plurality of light sources, wherein the plurality of light sources emits a spectral output; a first medium proximate the plurality of light sources, wherein the first medium is arranged to spatially homogenise the spectral output of the plurality of light sources; a second medium adjacent the first medium, wherein the second medium is arranged to angularly homogenise the spectral output of the plurality of light sources; wherein the spectral output of the plurality of light sources traverses the first medium before traversing the second medium.

In this way, there is provided an apparatus which addresses the homogenising problem caused by the use of multiple light sources, for example LEDs with discrete and limited spectral coverage, to provide a spectrum broader than from a single light source. The apparatus allows for homogenisation of the output of a plurality of light sources without producing significant waste energy and heat, or significantly reducing the irradiance of the spectral output of the plurality of light sources. In this way, an apparatus for producing a spectrally homogeneous and controllable line illuminator for use in spectral imaging applications is provided, such as hyper-spectral imaging where intensity, illumination shape and the spectral coverage is important. Further, the apparatus allows for a relatively high number of light sources to be combined such that a broad spectral output is produced, for example an array of discrete wavelength LEDs.

Preferably, at least a portion of the first medium has a higher refractive index than the external environment medium surrounding the first medium. More preferably, the first medium has a higher refractive index than the external environment medium surrounding the first medium. In this way, total internal reflection of the spectral output of the plurality of light sources can occur when the spectral output is traversing the first medium. For example, the first medium may comprise a cuboid or rectangular prism made from glass or transparent plastic and the external environment medium may be air. Alternatively, the first medium comprises reflective internal surfaces. In this way, reflection of the spectral output of the plurality of light sources can occur when the spectral output is traversing the first medium. For example, the first medium may comprise a tube with reflective internal surfaces such that the spectral output of the plurality of light sources traverses the external environment medium through the hollow tube via reflections from the reflective internal surfaces.

Preferably, the length-to-width ratio of the first medium is 100:1 or less. Preferably, the length of the first medium is the longest dimension of the first medium, and the width of the first medium is the longest dimension of the first medium perpendicular to the length. More preferably, the length-to-width ratio of the first medium is between 1:1 and 25:1. Still more preferably, the length-to-width ratio of the first medium is between 2:1 and 20:1. Still more preferably, the length-to-width ratio of the first medium is between 3:1 and 15:1. Still more preferably, the length-to-width ratio of the first medium is between 4:1 and 10:1. Preferably, the light sources of the plurality of light sources are arranged symmetrically about the longitudinal axis of the first medium. In this way, the length-to-width ratio of the first medium may be reduced.

Preferably, the sum of the vectors defining the spectral output of each light source of the plurality of light sources defines a first direction. Preferably, the longitudinal axis of the first medium is parallel to the first direction. Preferably, the longitudinal axis of the second medium is perpendicular to the first direction.

Preferably, the second medium comprises a diffuser for shaping ray angles of the spectral output of the plurality of light sources. Preferably, the diffuser is a highly transmissive medium for controlling angular emissions of the spectral output of the plurality of light sources. Alternatively, the diffuser is a highly reflective medium for controlling angular emissions of the spectral output of the plurality of light sources. In this way, the diffuser is specifically engineered with beam shaping properties, such as a controlled divergence angle, to suit the application of the spectral output homogenising apparatus. In particular, the diffuser may be a holographic diffuser, diffractive diffuser, high efficiency diffuser or beam shaping diffuser. In limited applications, the diffuser may be an opal diffuser or ground glass diffuser. The purpose of this second medium is to create an angularly homogeneous spread of rays exiting the second medium across the length and width of the second medium. A beam shaping or holographic type of optical diffuser may comprise a micro or nano engineered surface texture features controlling exiting beam angle spread. This is preferred over conventional diffusers such as ground glass, sand blasted glass or plastic or similar or opal type diffusers, due to better transmission levels and control over angular spread in both angle and axis. The opal or ground glass type of diffuser may be used as the second medium in embodiments where preserving optical power is less important.

Preferably, the plurality of light sources comprises a plurality of Light Emitting Diodes (LEDs) and/or a plurality of laser diodes (LDs). Preferably, the plurality of LEDs are bare chip LEDs. Alternatively, the plurality of light sources comprise at least one of the following: packaged LEDS; bare LED dies; superluminescent diodes (SLDs); organic LEDs (OLEDs); or tungsten-halogen bulbs. Alternatively, the plurality of light sources further comprises a traditional bulb source, such as a tungsten-halogen bulb.

Preferably, the plurality of light sources comprises at least two light sources that emit different discrete wavelength outputs.

Preferably, the plurality of light sources further comprises a phosphor material for broadening the spectral output of the plurality of light sources. More preferably, the phosphor material is positioned between at least one light source in the plurality of light sources and the first medium. The phosphor element of the light source may involve a blue laser diode exciting a phosphor plate or powder material. The phosphor element may consist of a phosphor rod that is excited by a row of LEDs or laser diodes, as in U.S. Pat. No. 7,982,229.

Preferably, the plurality of light sources is a single row of light sources. Alternatively, the plurality of light sources is a plurality of adjacent rows of light sources.

Preferably, the width of the first medium is equal to or greater than the width of the plurality of light sources. Preferably, the width of the second medium is equal to or greater than the width of the plurality of light sources. Preferably, the height of the first medium is equal to or greater than the height of the plurality of light sources. Preferably, the height of the second medium is equal to or greater than the height of the plurality of light sources.

Preferably, the distance between the plurality of light sources and the first medium is less than 15 mm. More preferably, the distance between the plurality of light sources and the first medium is less than 2 mm. More preferably, the distance between the plurality of light sources and the first medium is less than 1 mm. Still more preferably, the distance between the plurality of light sources and the first medium is less than 0.5 mm. In limited embodiments, the distance between the plurality of light sources and the first medium is 0 mm. Preferably, the plurality of light sources is not in contact with the first medium. In this way, the plurality of light sources and the first medium are sufficiently close and coupling efficiency is improved while still achieving total internal reflection within the first medium. It may also be preferable to include a lens between the plurality of light sources and the first medium. In such an embodiment, the lens may assist in coupling the plurality of light sources to the first medium.

Preferably, the first medium comprises a prismatic portion. In this way, homogenisation using total internal reflection of spectral output traversing the first medium is improved.

Preferably, the second medium comprises at least one plate. Preferably, the distance between the first medium and the second medium is less than 15 mm, more preferably less than 10 mm, still more preferably, less than 5 mm. Most preferably, the distance between the first medium and the second medium is 0 mm. Preferably, the first medium portion abuts or is connected to the second medium. In this way, the coupling efficiency of the apparatus is improved.

Preferably, the first medium is connected to the second medium by a refractive index matching member. The refractive index matching member comprises a material which is transmissive to the spectral output of the plurality of light sources. More preferably, the refractive index matching member comprises a glue and/or silicone. Preferably, the refractive index of the first medium and the refractive index of the refractive index matching member are substantially identical.

According to a second aspect of the present invention there is provided use of the apparatus according to the first aspect of the invention to homogenise the spectral output of a plurality of light sources.

According to a third aspect of the present invention there is provided a method of homogenising light from a plurality of sources, comprising providing an apparatus according to the first aspect of the invention, providing a current to the plurality of light sources such that light is emitted from at least two light sources within the plurality of light sources.

Preferably, the method comprises providing a plurality of apparatus according to the first aspect of the invention. The plurality of apparatus can be arranged adjacent and planar such that a method of scaling multiple homogeniser modules to extend output line length is provided.

Preferably, the method further comprises the step of monitoring the spectral output of at least one light source within the plurality of light sources. More preferably, the step of monitoring the spectral output of at least one light source within the plurality of light sources comprises continually monitoring the spectral output of at least one light source within the plurality of light sources.

DETAILED DESCRIPTION

Embodiments of the present invention will now be described by way of example only and with reference to the accompanying drawings, in which:

FIGS. 7A and 7B depict an aerial view of a third embodiment of an apparatus in accordance with the first aspect of the present invention and corresponding intensity-distance graphs of the spectral output of the apparatus;

It is understood that the spectral output of the plurality of light sources may be any appropriate form of electromagnetic radiation, in particular visible light, Ultraviolet (UV) and Infrared (IR). Further, it is understood that the plurality of light sources may include any suitable light source. Wherein Light Emitting Diodes (LEDs) are used in some of the following examples and embodiments, it is understood that similar principles can be applied and transferred to alternative light sources.

It is known, in many applications, that the use of LEDs provides numerous advantages over the use of incandescent bulbs or arc lamps. LEDs are more energy efficient, hold a longer lifespan and have no risk of explosion unlike standard bulbs which are under high pressure, such as metal-halide, xenon and tungsten-halogen bulbs. Additionally, LEDs can be intensity controlled, by controlling the current passing through the LED, and precision controlled allowing for high-speed electronic switching. As such, it is envisaged that the plurality of light sources may comprise a plurality of LEDs.

Figure 1:
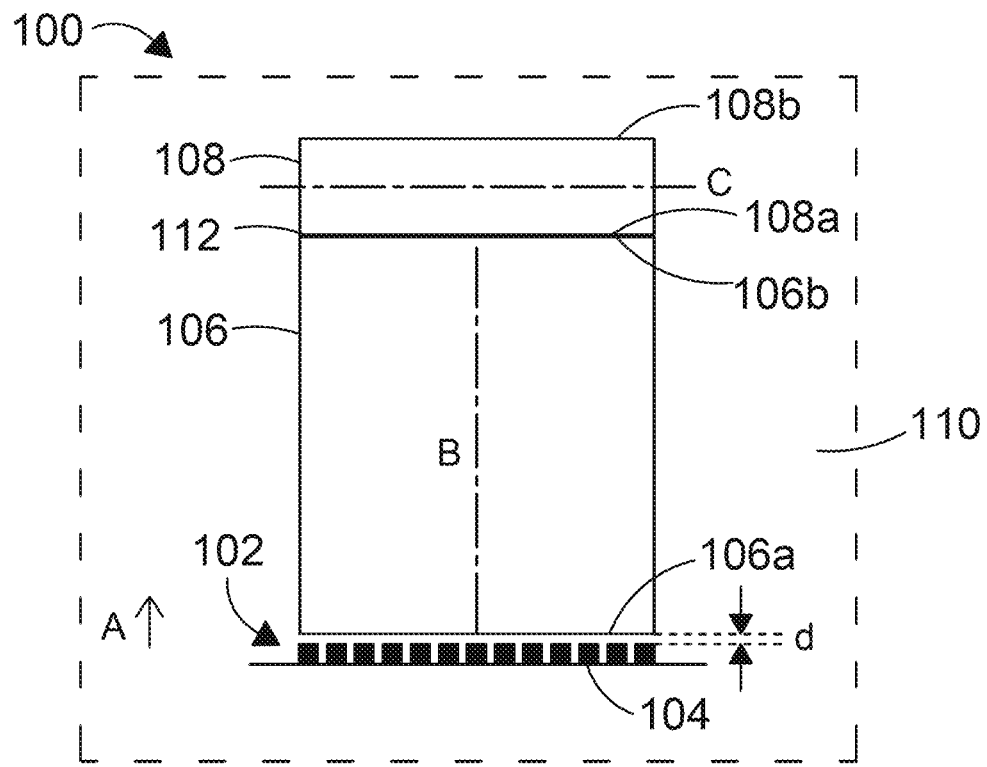
FIG. 1 depicts an aerial view of an apparatus in accordance with the first aspect of the present invention.

With reference to FIG. 1, there is shown an apparatus 100 in accordance with the first aspect of the invention. Within the apparatus 100 there is provided a plurality of light sources 102 arranged such that the plurality of light sources 102 comprises a single row of light sources 104. The plurality of light sources 102 has a spectral output formed from the combination of emission outputs of each light source 104 of the plurality of light sources 102.

The light sources 104 are selected to cover a spectral region appropriate for the intended application. For example, the application may require the plurality of light sources 102 to produce a spectral output in the UV region (wavelengths from 250 nm to 400 nm), visible region (400 nm to 650 nm), in the near IR region (650-1000 nm or 1000-1700 or 1700-2500) or beyond. The application may require a spectral region including other regions available to the light sources 104, all regions or partial regions combined.

Figure 2:
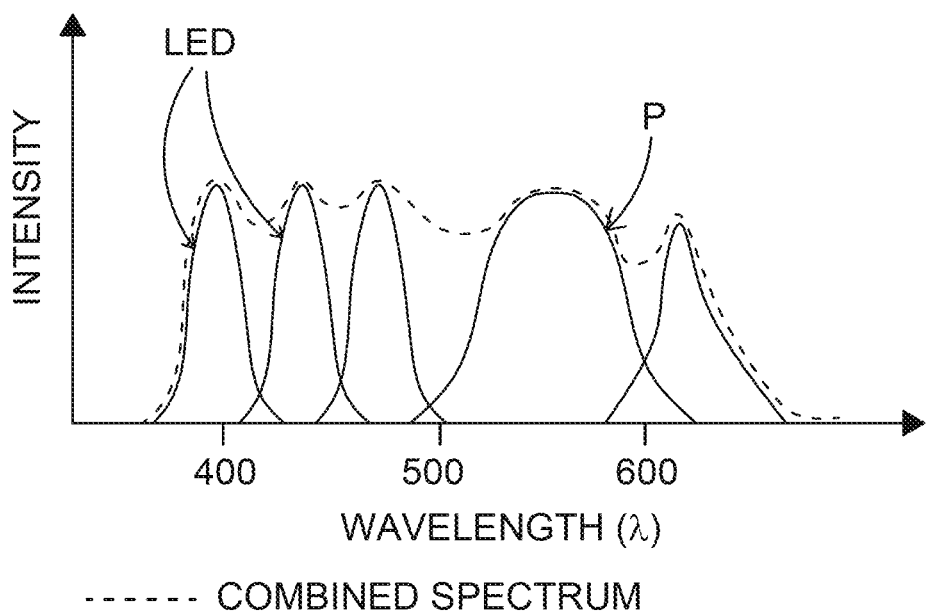
FIG. 2 depicts discrete LED emissions and the combined spectrum of an array of LEDs on an Intensity-Wavelength graph.

For example, the plurality of light sources 104 may be a plurality of LEDs arranged in an array. Herein, each LED of the plurality of LEDs emits a discrete wavelength emission output, with the plurality of LEDs emitting a combined spectral output. In an example of such a case, FIG. 2 shows both the discrete LED spectrum of an array of LEDs (LED arrow) and a phosphor emission (P arrow), as well as the combined spectrum they produce, covering the visible spectrum from 400 nm to 650 nm. It can be seen that the combination of LEDs and phosphor material emission (P) combine to produce a relatively flat spectral profile between 400 nm and 650 nm. In this way, it is shown that use of an array of LEDs can be manipulated, such as through selection or weighting of each LED, so that the individual LED emission outputs combine to produce a desirable spectral response of the array.

LEDs of differing spectral output often have differing power outputs. For example, LEDs within the blue wavelength region often possess a stronger power output compared to deep UV wavelength LEDs or LEDs within or close to the green wavelength region. Therefore, obtaining a relatively flat spectral response, as shown in FIG. 2, can be achieved by choosing fewer LEDs of strong power or choosing a single LED, and combining this with multiple LEDs of weaker power. In this case, all the LEDs in the array can be driven in series by a single current supply, and the current can be increased or decreased to alter the power evenly across the whole array of LEDs. This process reduces costs, simplifies the circuitry and simplifies control in cases when a fixed spectral output is required.

Figure 3A:
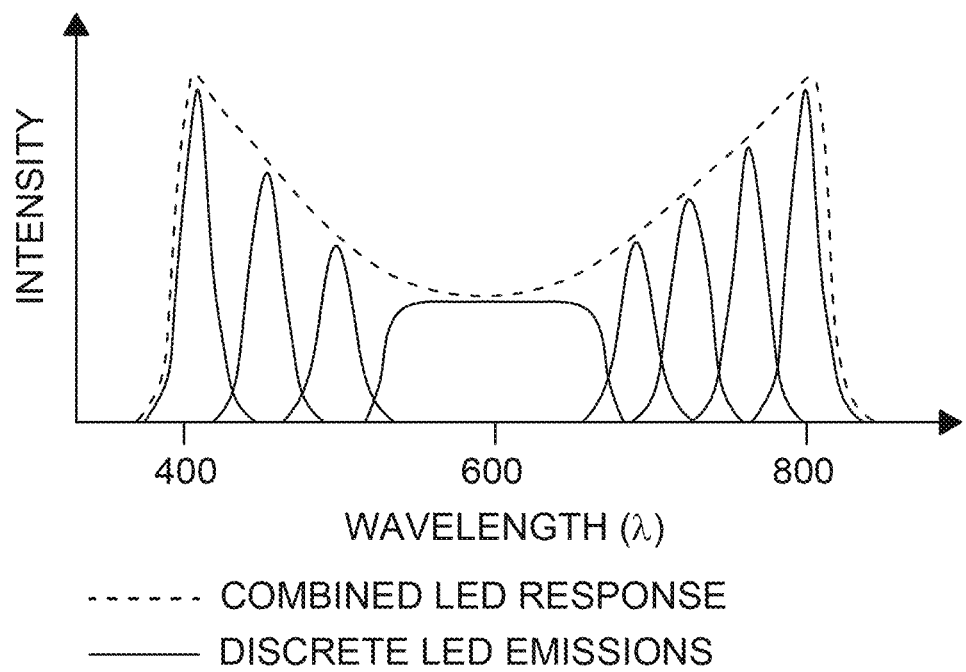
FIGS. 3A and 3B depict Intensity-Wavelength graphs for an array of discrete wavelength LEDs, weighted to compliment the spectral response of a camera.
Figure 3B:
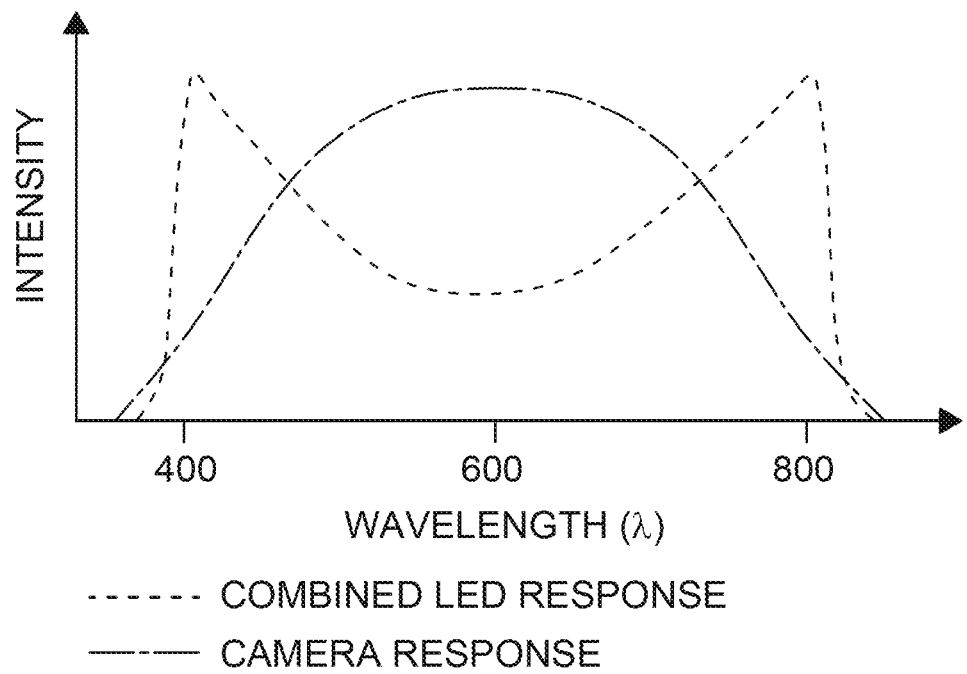

Additionally, the plurality of light sources can be altered instead by electrically controlling each light source in the plurality of light sources independently, or controlling each light source with identical spectral output with its own dedicated controllable current supply. This allows the spectral profile of the plurality of light sources to be modified dynamically to suit the application, for example, the current, and thus the output power, of given light sources can be adjusted to achieve a flat spectral response, such as that shown in FIG. 2. Alternatively, a trough shape may be implemented as in FIGS. 3A and 3B. This spectral shape complements the typical spectral response of a camera peaking in the green region, leading to a flat response with a fixed imaging exposure time when an LED array and camera are used in combination. An even exposure across the spectrum of interest may be desirable in a number of applications.

With reference to FIG. 1, there is further provided a first medium 106. In this embodiment, the first medium 106 is an optically transmissive rectangular prism mixing plate 30 mm wide, 50 mm long and 1 mm deep, formed from glass. The refractive index of the first medium 106 is higher than the refractive index of an external environment medium 110 in which the first medium 106 is located. The first medium 106 must have a higher refractive index than the external environment medium 110 such that internal reflection can occur within the first medium 106. In this example, the first medium 106 is formed from glass and the external environment medium 110 is air. It is envisaged that the external environment medium 110 and the first medium 106 may be formed from any suitable material fit for purpose. In particular, it is envisaged that the first medium 106 may be glass such as BK7 or B270, plastic such as acrylic or polycarbonate, or quartz. The choice of material for the first medium 106 depends on the material transmission properties at the desired wavelength region. For example, BK7 glass has desirable transmission properties for use with emissions in the visible region and fused silica has desirable properties for use when ultraviolet (UV) region emissions are required.

The emission output from each light source 104 has a Lambertian emission profile, with the greatest emission exiting the light source 104 in a first direction, as indicated by arrow A. Other emission profiles are envisaged and fall within the scope of the disclosure. The longitudinal axis of the plurality of light sources 102 is substantially perpendicular to the first direction A. The spectral output of each light source 104 exits the light source 104 and traverses the external environment medium 110, until the output meets the first medium 106. The first medium 106 is located at a distance d from the plurality of light sources 102. The distance d between the plurality of light sources 102 and the first medium 106 is minimised to ensure optimal coupling between the plurality of light sources 102 and the first medium 106. This close proximity increases the amount of emission output captured and preserved from each light source 104 that enters the first medium 106 to maintain maximum energy transfer into the first medium 106.

In some embodiments, the plurality of light sources is a plurality of bare chip LEDs. Bare chip LEDs allow for tight packing densities, increasing the total power per unit length (or area) of the plurality of light sources 102. The close proximity of the first medium 106 to the plurality of light sources 102 is important as it improves the coupling efficiency of the apparatus 100 thus increasing the irradiance of the spectral output exiting the apparatus 100. In this case, the distance d between the plurality of light sources 102 and the first medium 106 is less than 1 mm. In applications wherein a hermetic seal is required, such as for some LED UV chips, it is envisaged that the second medium 106 forms the top barrier to the air and the distance between the plurality of light sources and the first medium is close to 0 mm.

It is preferred that there is a gap present between the plurality of light sources and the first medium. In this way, the plurality of light sources and the first medium are not in contact and thus total internal reflection within the first medium can occur. It is envisaged the gap may be the external environment medium, air or any other suitable medium with a refractive index lower than the first medium.

Herein, the emission output of each light source 104 enters the first medium along a first side 106a and traverses the first medium 106 such that the spectral output exits along a second side 106b. Upon exiting the first medium 106 along this second side 106b, the entire spectral output of the plurality of light sources 102 is spatially homogenised. The first side 106a and second side 106b are opposing, parallel sides of the first medium 106.

There is further provided a second medium 108 adjacent to, and in contact with, the first medium 106. Upon exiting the first medium 106 along the second side 106b, the spectral output of the plurality of light sources 102 traverses an interface material 112 such as a refractive index matching silicone or glue until the spectral output reaches a first side 108a of the second medium 108. Herein, the spectral output enters the second medium 108a, via the first side 108a, and traverses the second medium 108 until the spectral output exits via a second side 108b. The second medium is responsible for creating angular homogeneity along the length of 108b's length. This is achieved by the beam shaping or diffuse scattering nature of the second medium 108. The first side 108a and second side 108b are opposing, substantially parallel sides of the second medium 108. Upon exiting the second medium 108 along its second side 108b, the entire spectral output has retained its spatial homogeneity and is now also angularly homogenised along the length and width of the second side 108b.

In some embodiments, the second medium 108 may also be etched or engineered directly onto the second side 106b of the first medium 106. In this case the first and second medium are essentially one piece of glass. However, the distinct nature and the required sequence of each medium still exists, with the spatial homogenising element occurring prior to the angular homogenising element.

In some embodiments, the apparatus 100 may further comprise a refractive index matching portion located adjacent the first medium 106 and the second medium 108 for coupling the refractive index of the first medium 106 to the refractive index of the second medium 108.

The width of the first medium 106 is approximately equal to the width of the plurality of light sources 102, and the longitudinal axis B of the first medium 106 is parallel to the first direction A. The width of the second medium 108 is also approximately equal to the width of the plurality of light sources 102. The longitudinal axis C of the second medium 108 is perpendicular to the first direction A. In this way, the distance travelled by the spectral output of the plurality of light sources 102 through the first medium 106 is further than the distance traversed by the spectral output in the second medium 108.

Figure 4:
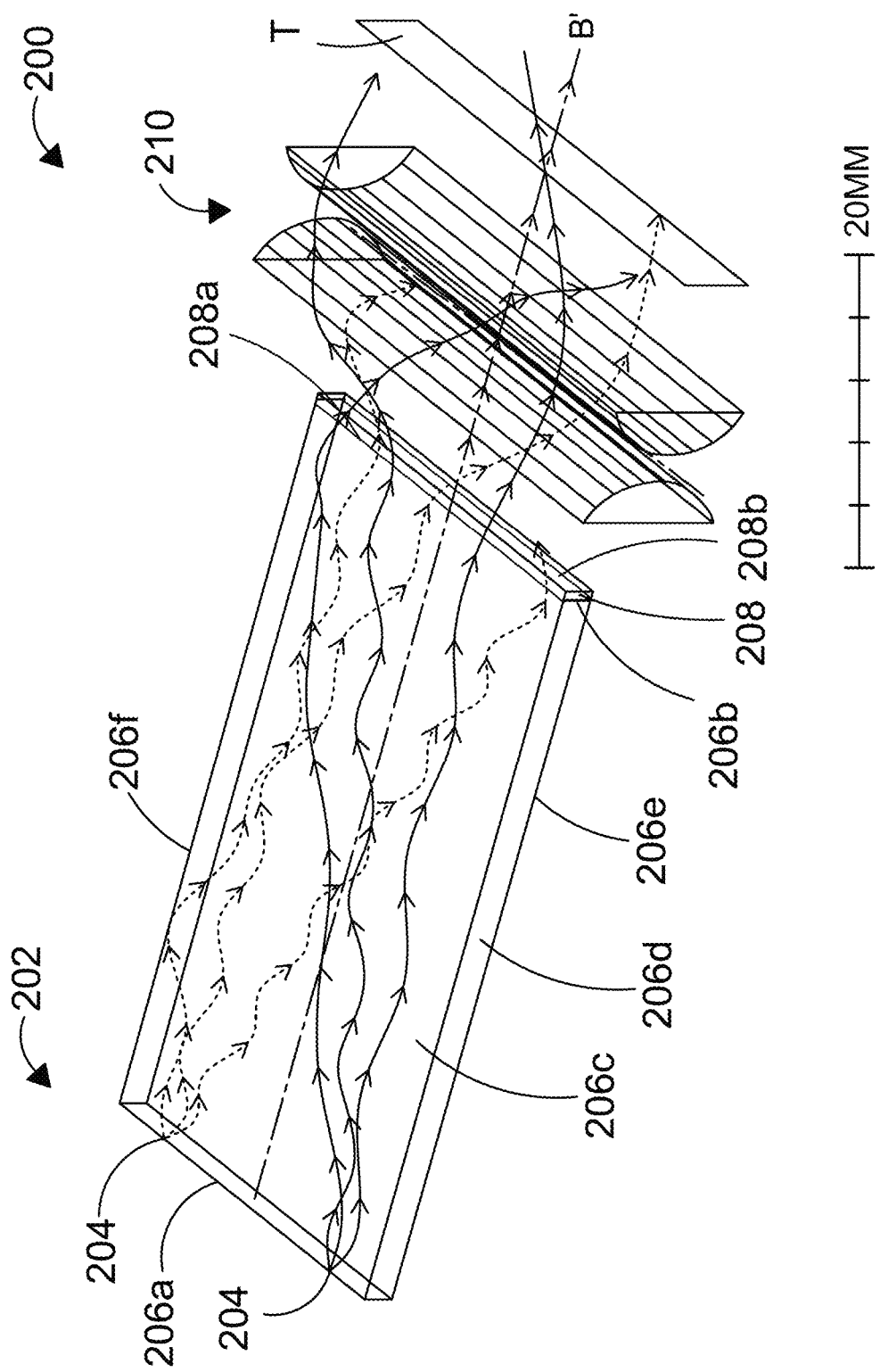
FIG. 4 depicts an isometric view of a second embodiment of an apparatus in accordance with the first aspect of the invention.

With reference to FIG. 4, there is shown an isometric view of an apparatus 200 in accordance with the first aspect of the invention. The plurality of light sources 202 comprises two light sources 204 and a first medium 206 comprising a rectangular prism. The spectral output of the plurality of light sources 202 traverses the first medium 206 before traversing the second medium 208.

Each light source 204 sits symmetrically about the longitudinal axis B' of the first medium 206 and at the mid-height of the depth of the first medium 206. The simplified emission output from each light source 204 is shown on FIG. 4 as three random arrows emitted from each light source 204, which enter a first surface 206a of the first medium 206.

The rectangular prism first medium 206 utilises the principle of total internal reflection. The emission output of the light sources 204 which contact a third surface 206c, fourth surface 206d, fifth surface 206e or sixth surface 206f of the first medium 206 are reflected from these surfaces and trapped within the first medium 206 by total internal reflection. It is for this reason that the refractive index of the first medium 206 must be greater than the refractive index of the external environment medium surrounding the first medium 206. In this way, substantially no light source 204 output exits the first medium 206 via the third surface 206c, fourth surface 206d, fifth surface 206e or sixth surface 206f of the first medium 206 and so the spectral output is contained in the first medium 206 until the spectral output exits the first medium at the second side 206b.

The spatially homogenised spectral output from 206b then enters the second medium 208a and traverses 208 and exists 208b with angular homogeneity across the output of 208b. The second surface 206b of the first medium 206 and the first surface 208a of the second medium 208 is a refractive index matching glue or silicone. In some embodiments, the output of medium one 206b is in contact with 208a or has a very small gap of surrounding medium air. In any of the cases the distance between 206b and 208a should be as small as possible, preferably less than 1 mm and more preferably 0 mm. Alternatively, 208 could be machined or etched onto the surface of 206b.

The apparatus 200 of FIG. 4 further comprises an imaging portion 210 for imaging the homogenised spectral output to a target. An example of a target plane T is indicated on FIG. 4.

The output of the light sources 204 is thus spatially mixed in the first medium 206 by total internal reflection, increasing the spatial and spectral homogeneity of the spectral output of the plurality of light sources 202, and coupled to the second medium 208. Wherein the plurality of light sources is a single row of light sources, a spatially homogeneous line of spectral output is emitted from the second surface 206b of the first medium 206.

Figure 5A:
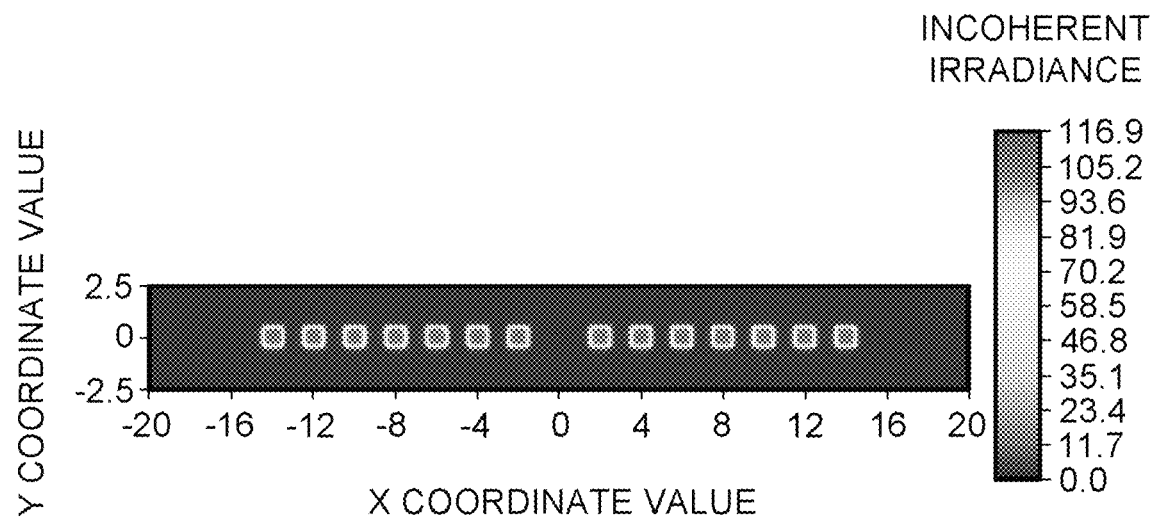
FIGS. 5A and 5B depict the effect of a first medium of the apparatus in accordance with the first aspect of the invention on the spectral output of a plurality of light source.
Figure 5B:
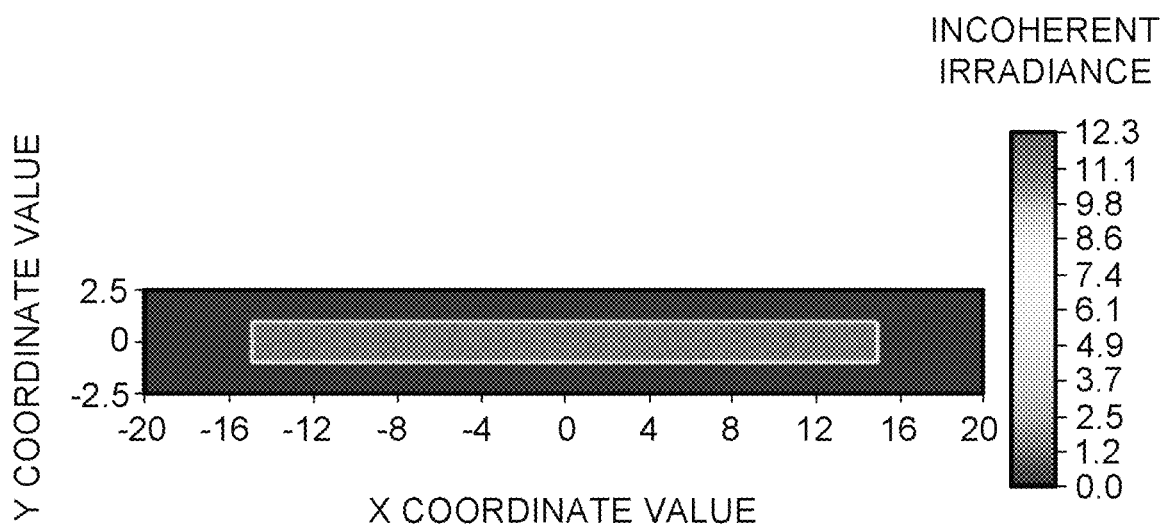

The effect of a first medium on the spectral output of a plurality of light sources is shown in FIGS. 5A and 5B. The plurality of light sources comprises fourteen LEDs and the spectral output of the plurality of light sources upon entering and exiting the first medium is shown. FIG. 5A depicts the uneven spatial and spectral output of the plurality of light sources at the point where the spectral emission enters the first medium on its first side. FIG. 5B depicts the spatial and spectral homogeneity of the spectral output at the point where the output exits the first medium on its second side. The spectral output in FIG. 5B shows a spectral output which is spatially homogenised but does not have sufficient angular homogeneity.

Figure 6A:
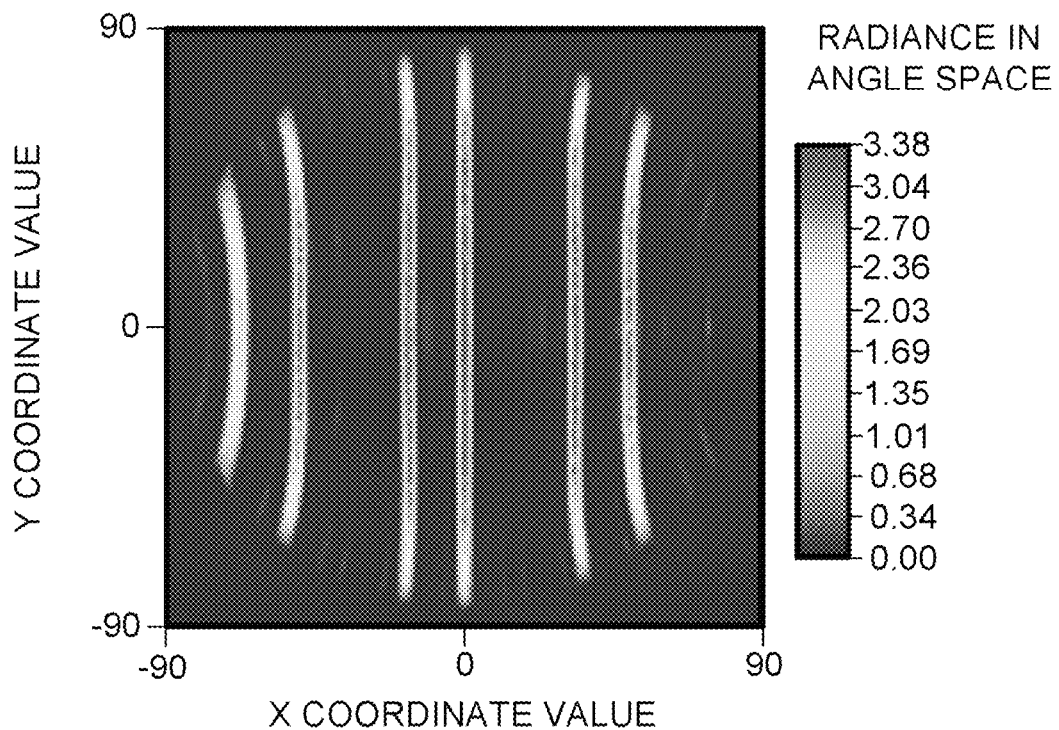
FIGS. 6A and 6B depict the effect of a second medium of the apparatus in accordance with the first aspect of the invention on the angular output of a plurality of light sources.

Following the effect of the first medium, the angular homogeneity of the spectral output exiting the first medium taken as a whole, is angularly complete. However, any subsection of the spectral output at the second surface 206b, for example over a small subsection of 5 mm length, has poor angular homogeneity (FIG. 6A). Each subsection across the second medium 208 will have a differing angular output. Projecting this spatially homogenised but angularly inhomogeneous line onto the target using conventional imaging optics, such as cylinder lenses, will translate into spatial inhomogeneity at the target plane. The length of the first medium may be increased to improve the angular homogeneity of the spectral output exiting the first medium. However, to reach adequate levels of angular homogeneity across every subsection of the spectral output would require an impractically long first medium, with significant transmission losses through the first medium. In this way, the apparatus of the present invention combining a first medium and second medium offers a smaller and more efficient means to produce an adequately homogenised spectral output.

Figure 6B:
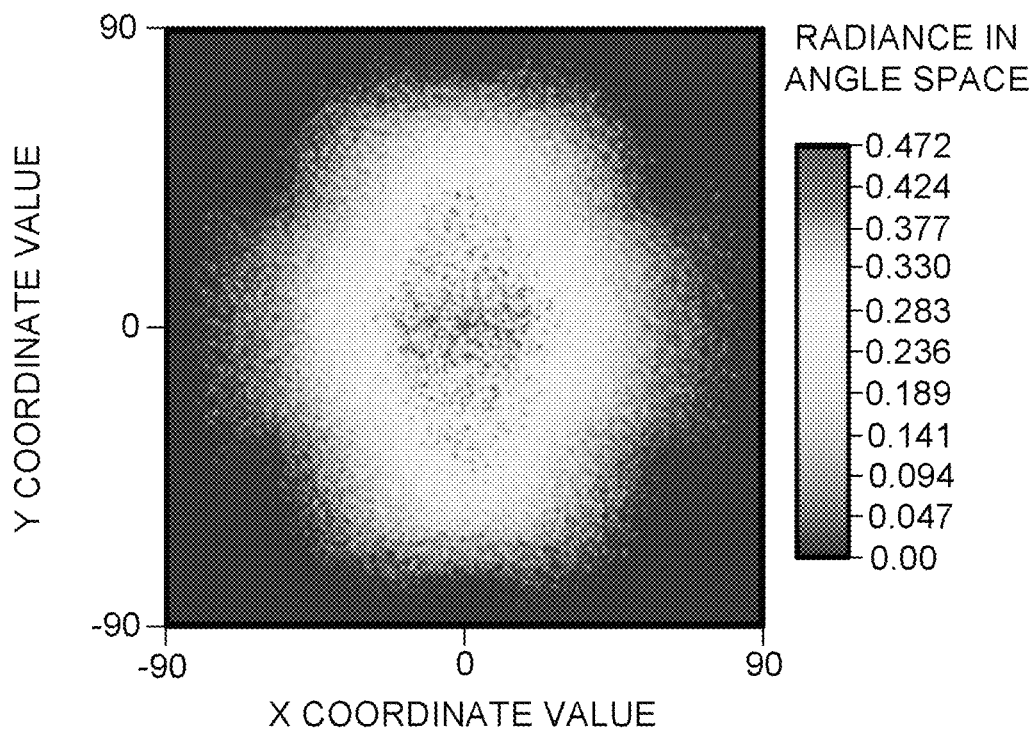

The angular inhomogeneity from a subsection is shown in FIG. 6A. The effect of the second medium on this subsection is shown in FIG. 6B. The spectral output has been spatially homogenised by the first medium, however, as can be seen by FIG. 6A the spectral output of the subsection has inhomogeneity in angular spread. This homogeneity problem is seen specifically in the X-axis with reasonable homogeneity in the Y-axis. Therefore, in this embodiment, only correction in the X-axis is required. FIG. 6B shows the effect of the second medium on the angular output, The final projected output now has both spatial and angular homogeneity across the length of second medium. The spectral output of FIG. 6B does not have perfect angular homogeneity, However, the improvement shown between FIGS. 6A and 6B is adequate for many applications. For applications requiring greater angular homogeneity, a more powerful second medium, such as a second medium comprising a diffuser or beam shaping element with greater angular diffusing effect, can be used. Alternatively, two beam shaping elements could be used in sequence.

Neither the first medium nor second medium taken alone would homogenise the spectral output of the plurality of light sources in this way. As such, both mediums are used together, with the spectral emission of the plurality of light sources traversing the first medium prior to traversing the second medium. Both spatial and angular homogeneity are required prior to allowing simple optical imaging from the output of the second medium to the target.

In the embodiment of FIG. 4, to achieve angular homogeneity, the second medium 208 comprises an angularly defined beam shaping diffuser, adjacent the first medium 206. Beam shaping diffusers and light shaping diffusers use micro or nano arrays of lenses or holographic methods to engineer the shape and direction of light transmitting through the diffuser. The combination of the first medium 206 followed by the second medium 208 provides a spatial and angularly homogenised, spectrally mixed line shaped output. From this output, conventional imaging methods for projecting this source line output to a target plane T as a line is widely understood. Common methods may use single or multiple cylinder lenses, Fresnel lenses or a parabolic or elliptical mirror method to create the required line on the target plane. The design or selection of such imaging optics can be used to control the line width at the target plane T as well as the working distance to the target.

Traditional diffusers, such as diffusers typically made from opal or ground glass surfaces, can lead to significant losses of power due to their broad scattering nature. Unlike traditional diffusers, holographic or beam shaping diffusers are more efficient in their transmission properties and the specific engineered properties of these diffusers allow for tailoring to specific problems, such as single axis angular correction. Simple diffusers may be appropriate in limited applications of the apparatus 200.

In the case wherein the plurality of light sources 202 comprises a single row of light sources, such as in the embodiments of FIGS. 1 and 4, a beam shaping diffuser with a low Y-axis spread by high X-axis spread is utilised to achieve angular homogeneity of the spectral output of the plurality of light sources 202 by spreading rays in a single axis, the X-axis, only. It is understood that more sophisticated holographic or beam shaping diffusers can provide a greater homogenising effect, however, the homogenising effect of low-cost, basic beam shaping diffusers is more than adequate in many applications. In this way, the apparatus 200 of the first aspect of the present invention may be relatively low-cost and low-complexity.

The spatial and angularly homogenised spectral output exiting the second medium 208 can then be applied, for example, in standard, widely used collection and imaging optical methods to bring the source or object to the target as an image. The optical solution is designed to provide the required magnification and working distance to suit the specific application.

FIG. 4 shows an imaging portion 210 comprising two cylinder lenses in series as an example of a possible optical imaging method. As the output of the second surface 208b of the second medium 208 is both spatial and angularly homogeneous the image created by the lenses will be a sufficiently homogeneous spectral mixture of the discreet LEDs 202.

The length-to-width ratio of the first medium 206 is related to its capacity to evenly distribute light from any point at the input on its first surface 206a. With a first medium 206 of given width, a sufficient length will mean that the light is evenly distributed across the output on the second surface 206b. The length-to-width ratio in this embodiment is 5:3.

In applications wherein it is beneficial to reduce the overall length of the apparatus 200, the length-to-width ratio can be reduced using a symmetric approach. By implementing approximate symmetry within the plurality of light sources 202, wherein light sources 204 of a similar spectral emission and wavelength are placed symmetrically about the longitudinal axis of the first medium 206, a homogeneous output can be achieved with a lower length-to-width ratio.

With reference to FIGS. 7A and 7B, an apparatus in accordance with the first aspect of the invention, such as the apparatus 200 of FIG. 4, is shown. The apparatus may be considered a single module 300a, 300b or unit which provides the desired power and spectral response, shown in FIG. 7A. Modules 300a, 300b may be combined together in building block fashion such that this effect is scaled up with multiple modules 300a, 300b placed side by side, shown in FIG. 7B, to deliver the required spectral output length 11, 12. The extent to which the power drops off at the edges of the line illuminator informs the spacing necessary between each module 300a, 300b such that the line of spectral output is scaled to the desired length 11, 12.

It is envisaged that each module 300a comprises a plurality of light sources, a first medium, a second medium and an imaging portion 312a. It is also envisaged that the imaging portion 312a may span a plurality of modules 300b, shown in FIG. 7B, such that each module 300b comprises a plurality of light sources, a first medium, a second medium and shared imaging portion.

Figure 8:
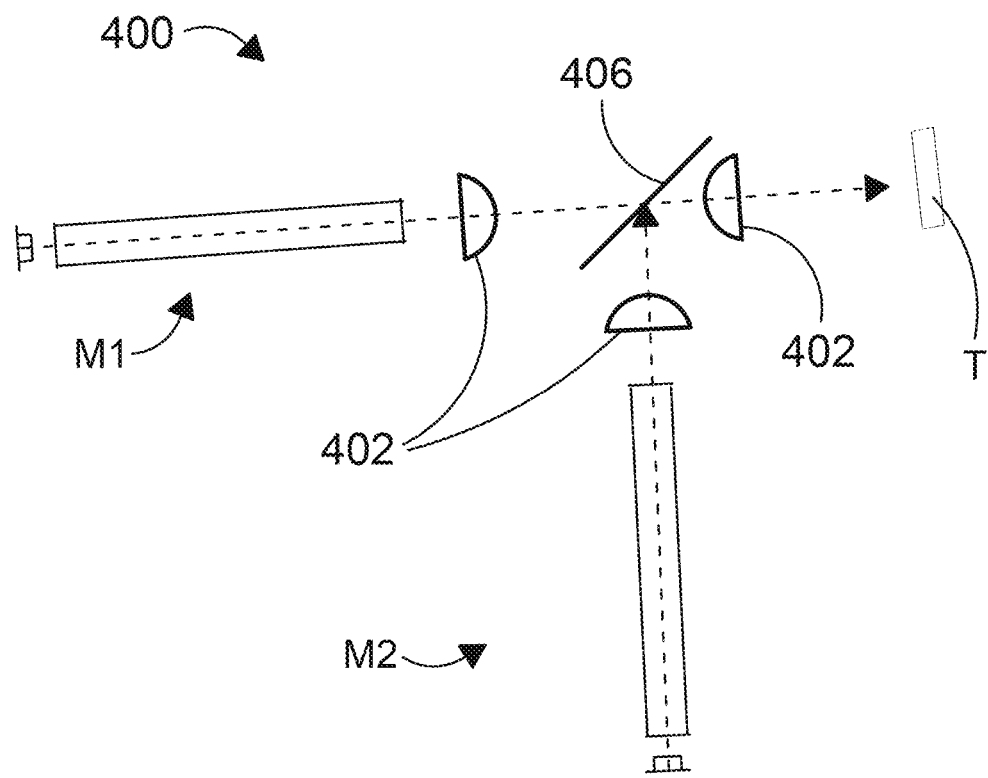
FIG. 8 depicts a fourth embodiment of an apparatus in accordance with the first aspect of the invention.

FIG. 8 depicts an alternative configuration of an apparatus 400 in accordance with the first aspect of the invention, such that intensity at the target T is increased. The apparatus 400 comprises two modules M1, M2, each module M1, M2 comprising a plurality of light sources, a first medium and a second medium. The plurality of light sources of M1 has the spectral output 520-700 nm and the plurality of light sources of M2 has the spectral output 365-520 nm. The choice of spectral region of the light source is chosen dependent on application and is not particularly limited. Irradiance at the target T can be significantly increased over a given spectral region by splitting the spectral region over two modules M1, M2 with two separate first medium and second medium, and then combining the spectral output using a dichroic mirror 406, as shown in by the arrows in FIG. 8. The apparatus 400 comprises three imaging members 402, each imaging member 402 comprising an imaging lens, such as cylindrical or Fresnel lens. The spectral output of both modules M1, M2 pass through an imaging member 402 before being combined by the dichroic mirror 406. The spectral output of each module M1, M2 meet at right angles at the dichroic mirror 406. The combined spectral output then passes through an imaging member 402 before reaching a target T. The spectral output exiting each module M1, M2 is both spatially and angularly homogenised. In this embodiment, the irradiance on the target T is around two times that achievable from a single module comprising a plurality of light sources, a first medium and a second medium with light sources covering the 365-700 nm spectrum. This apparatus can be extended to combine multiple modules each having a specified spectral output. A dichroic mirror acts as an efficient filter for manipulating the spectral output reaching the target T, with reduced heating and improved illumination intensity at the target T. The imaging members 402 assist in combining the spectral output from each module M1, and M2 and imaging the combined spectral output to the target T.

In alternative embodiments, one or more modules M1, M2 may comprise a traditional tungsten halogen bulb and an LED array. Further, the spectral output may pass directly to the target after the dichroic mirror 406 such that the third imaging member 402 is not present. Alternative configurations to that depicted in FIG. 8 are envisaged without departing from the scope of the present invention.

Small wavelength peak shifts are common with some light sources, such as LED sources. To overcome any negative effect of this within applications such as hyperspectral imaging, real time monitoring of the spectral profile can be initiated. This may be done through feedback of a tiny portion of the homogenised light output into a spectrometer and used as a reference source to compare to the imaging camera results. An apparatus 500 in accordance with the first aspect of the invention is shown in FIG. 9 for undertaking this feedback process.

Figure 9:
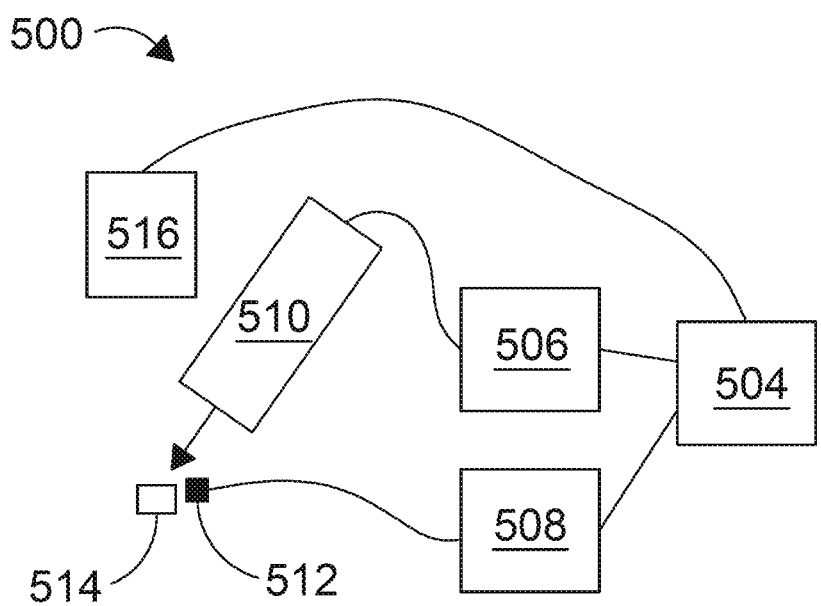
FIG. 9 depicts a fifth embodiment of an apparatus in accordance with the first aspect of the invention.

The apparatus 500 of FIG. 9 includes a processing unit 504 comprising a computer for real time processing, a control unit 506, a spectrometer 508, an LED line illuminator 510 comprising an apparatus in accordance with the second aspect of the invention and a heatsink, a sensor 512 comprising a fibre arranged to sample the output of the LED line illuminator 510, a target 514 which the LED line illuminator 510 is arranged to illuminate and a camera 516 arranged to view the target 514. FIG. 9 depicts a line illumination setup with real time spectral monitoring. A reference spectrum of the illumination is commonly taken at the start of an imaging session when using incandescent bulbs, however, the spectral output of incandescent bulbs is more likely to remain fixed in shape than with an LED based source, such as an array of LEDs. In this way, real time monitoring overcomes any issues associated with LEDs and spectral drift; even if such drifts are only a couple of nm.

Alternatively or additionally to real time spectral monitoring, and as touched on in FIG. 2, phosphor may be used to reduce the quantity of light sources required to produce the desired spectral output, in particular when the plurality of light sources comprises discrete wavelength LEDs. For example, banks of LEDs or laser diodes which pump a range of phosphor materials emitting over a wide spectral region can be used. The combination of the plurality of light sources with different phosphor material provides the required spectral spread and enables a degree of spectrum shaping. For example, phosphor covered LEDs or appropriately shaped phosphor plates or rods can be used. In particular, a phosphor material can be used to broaden an LED spectral response from around 30 nm full width at half maximum (FWHM) to up to a few hundred nm, often by placement over a higher frequency LED, such as a blue or UV emitting LED. Further, the phosphor can be excited by an LED, laser or super luminescent diode and placed in contact with or held remote from the pump source. A phosphor material can also be used to help overcome the well-known weak green-gap region of LEDs. A mixture of narrowband LEDs and limited phosphor pumped emitters are considered advantageous in meeting some application's spectral requirements. Use of a phosphor material can also help to cover broad spectral regions needed in some applications, but this does limit the spectral control available and the ability to adjust the spectral response of a system. A benefit is the relatively broad and flat spectrum of the phosphor emission overcomes the wavelength shift in the narrower LED emission. This reduces the need for real time spectral monitoring.

Any of the aforementioned embodiments, may comprise multiple pluralities of light sources, such as one or more arrays of LEDs, with a plurality of equal length rows of light sources. In this case, the thickness of the first medium is increased to match or be slightly larger than the height of the plurality of light sources. It is envisaged that the number of rows in the plurality of light sources may be increased such that the plurality of light sources becomes an array which is square in shape. Additionally, other shapes, such as a circular array can be formed. Applications of these alternative shaped arrays include, but are not limited to, hyper-spectral imaging and applications wherein a reference light source is needed for inspection of parts or calibration of camera sensors. This is also beneficial in applications where greater power is required from the spectral output of the plurality of light sources, not necessarily greater intensity or irradiance.

Unlike incandescent bulbs, LEDs are made up of multiple narrow bandwidth sources. Typical full width at half maximum (FWHM) of an LED is in the region of 10-35 nm. With independent LED wavelength electronic control, each LED wavelength can be switched on and then off in isolation and this can be done sequentially though the whole spectrum. This level of control at the light source means that spectrally specific information can be obtained by a simple black and white camera. This provides an advantage where reduced cost is critical and very high spectral resolution of a sophisticated spectral imaging camera is not necessary, such as multi-spectral imaging. The arrangement of multiple LEDs of differing wavelength arranged to transmit into a first medium to spatially homogenise followed by a second medium to angularly homogenise prior to imaging by optics onto the target is relevant in this example.

In embodiments where the plurality of the light sources includes a light source with narrow emission angle such as from a laser diode a beam shaping diffuser should be used between such a light source and the entrance to 206 to increase the ray angles entering the 206a such that they are sufficiently wide enough angle to achieve the desired homogenising effect of 206.

When applying the invention to spectral imaging and other applications, a desired illumination pattern, such as a line at a given distance from the plurality of light sources, of given width and length, may be one that is of similar shape and size to the target or object that is to be illuminated. In the case of an illuminated line, a cylinder lens or Fresnel arrangement which images the -second medium output directly onto the target plane is desirable from the perspective of simplicity of design, in that it offers flexibility of control over user defined parameters such as working distance (distance from the plurality of light sources to the illuminated image), and magnification (line width and length).

The invention claimed is:

1. A spectral output homogenising apparatus, the apparatus comprising:
   a plurality of light sources comprising a plurality of LEDs and/or a plurality of laser diodes, wherein the plurality of light sources emits a spectral output;
   a first medium proximate the plurality of light sources wherein at least a portion of the first medium has a higher refractive index than the external environment medium surrounding the first medium, wherein the first medium comprises a prismatic portion, and, wherein the first medium is arranged to spatially homogenise the spectral output of the plurality of light sources;
   a second medium adjacent the first medium, wherein the second medium is arranged to angularly homogenise the spectral output of the plurality of light sources;
   wherein the spectral output of the plurality of light sources traverses the first medium before traversing the second medium,
   wherein the second medium comprises a holographic diffuser, diffractive diffuser, high efficiency diffuser or beam shaping diffuser for shaping ray angles of the spectral output of the plurality of light sources, and
   wherein the light sources of the plurality of light sources are arranged symmetrically about the longitudinal axis of the first medium.

2. The apparatus of claim 1, wherein the sum of the vectors defining the spectral output of each light source of the plurality of light sources defines a first direction.

3. The apparatus of claim 1, wherein the longitudinal axis of the first medium is parallel to the first direction.

4. The apparatus of claim 3, wherein the longitudinal axis of the second medium is perpendicular to the first direction.

5. The apparatus of claim 1, wherein the plurality of light sources further comprises a tungsten-halogen bulb.

6. The apparatus of claim 1, wherein the plurality of light sources comprises at least two light sources that emit different discrete wavelength outputs.

7. The apparatus of claim 1, wherein the plurality of light sources further comprises a phosphor material for broadening the spectral output of the plurality of light sources.

8. The apparatus of claim 7, wherein the phosphor material is positioned between at least one light source in the plurality of light sources and the first medium.

9. The apparatus of claim 1, wherein the plurality of light sources is a single row of light sources.

10. The apparatus of claim 1, wherein the plurality of light sources is a plurality of adjacent rows of light sources.

11. The apparatus of claim 1, wherein the width of the first medium is equal to or greater than the width of the plurality of light sources.

12. The apparatus of claim 1, wherein the height of the first medium is equal to or greater than the height of the plurality of light sources.

13. The apparatus of claim 1, wherein the first medium is connected to the second medium by a refractive index matching member.

14. The apparatus of claim 13, wherein the refractive index of the first medium and the refractive index of the refractive index matching member are substantially identical.

15. A method of using an apparatus to homogenise the spectral output of a plurality of light sources, comprising:
   using the apparatus, the apparatus comprising:
      a plurality of light sources comprising a plurality of LEDs and/or a plurality of laser diodes, wherein the plurality of light sources emits a spectral output;
      a first medium proximate the plurality of light sources wherein at least a portion of the first medium has a higher refractive index than the external environment medium surrounding the first medium, wherein the first medium comprises a prismatic portion, and, wherein the first medium is arranged to spatially homogenise the spectral output of the plurality of light sources;
      a second medium adjacent the first medium, wherein the second medium is arranged to angularly homogenise the spectral output of the plurality of light sources,
      wherein the spectral output of the plurality of light sources traverses the first medium before traversing the second medium,
      wherein the second medium comprises a holographic diffuser, diffractive diffuser, high efficiency diffuser or beam shaping diffuser for shaping ray angles of the spectral output of the plurality of light sources,
      wherein the light sources of the plurality of light sources are arranged symmetrically about the longitudinal axis of the first medium, and wherein a current to the plurality of light sources is provided such that light is emitted from at least two light sources within the plurality of light sources.

16. A method of homogenising light from a plurality of sources, comprising:

providing an apparatus comprising:
- a plurality of light sources comprising a plurality of LEDs and/or a plurality of laser diodes, wherein the plurality of light sources emits a spectral output;
- a first medium proximate the plurality of light sources wherein at least a portion of the first medium has a higher refractive index than the external environment medium surrounding the first medium, wherein the first medium comprises a prismatic portion, and, wherein the first medium is arranged to spatially homogenise the spectral output of the plurality of light sources;
- a second medium adjacent the first medium, wherein the second medium is arranged to angularly homogenise the spectral output of the plurality of light sources, wherein the spectral output of the plurality of light sources traverses the first medium before traversing the second medium, wherein the second medium comprises a holographic diffuser, diffractive diffuser, high efficiency diffuser or beam shaping diffuser for shaping ray angles of the spectral output of the plurality of light sources, wherein the light sources of the plurality of light sources are arranged symmetrically about the longitudinal axis of the first medium; and providing a current to the plurality of light sources such that light is emitted from at least two light sources within the plurality of light sources.

17. The method of claim 16, wherein the method further comprises the step of monitoring the spectral output of at least one light source within the plurality of light sources.

18. The method of claim 17, wherein the step of monitoring the spectral output of at least one light source within the plurality of light sources comprises continually monitoring the spectral output of at least one light source within the plurality of light sources.

* * * * *